United States Patent

[11] 3,568,153

[72] Inventors Gerald W. Kurtz
Saugerties;
August K. Pattin, Jr., Wappingers Falls, N.Y.
[21] Appl. No. 759,972
[22] Filed Sept. 16, 1968
[45] Patented Mar. 2, 1971
[73] Assignee International Business Machines Corporation
Armonk, N.Y.

[54] MEMORY WITH ERROR CORRECTION
8 Claims, 1 Drawing Fig.

[52] U.S. Cl. .......... 340/146.1, 340/172.5
[51] Int. Cl. .......... G11c 29/00, G06f 11/12
[50] Field of Search .......... 235/153; 340/146.1

[56] References Cited

Kolankowsky, E. et al. High Speed, Single-Error Correcting and Double-Error Detecting System. In IBM Technical Disclosure Bulletin. 10(10): p. 1439—1440. 1440. March, 1968. TK 7800. I13.

*Primary Examiner*—Malcolm A. Morrison
*Assistant Examiner*—R. Stephen Dildine, Jr.
*Attorneys*—Hanifin and Jancin and William S. Robertson

ABSTRACT: This invention relates to a memory for a data processing system in which the data stored in the memory is encoded to form check bits that permit identifying and correcting an error in a word of data read from the memory. The specification teaches improved circuits for changing the check bits to agree with a corrected word after an error has been detected and corrected.

PATENTED MAR 2 1971
3,568,153
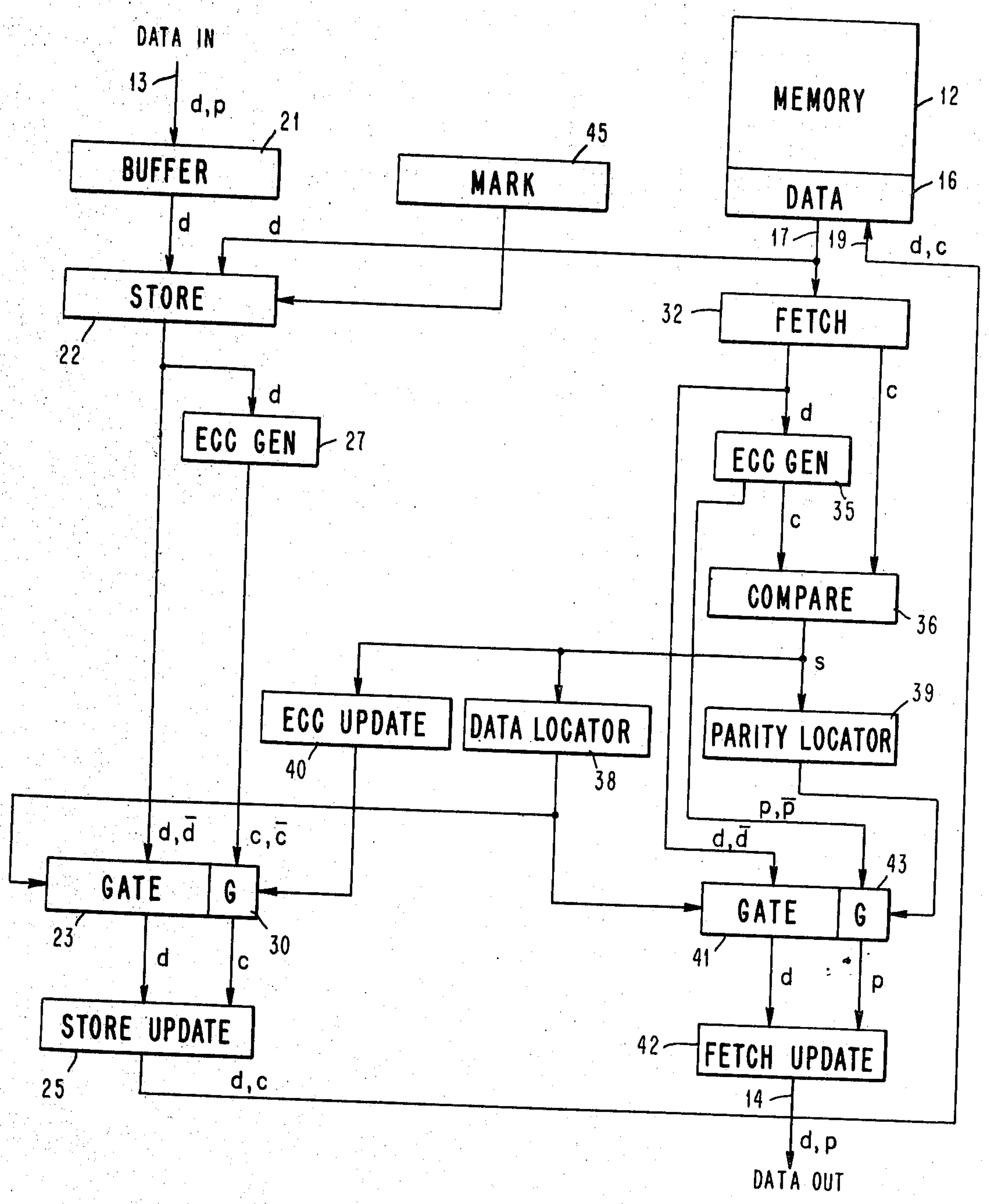
INVENTORS
GERALD W. KURTZ
AUGUST K. PATTIN, JR
BY [signature]
ATTORNEY

MEMORY WITH ERROR CORRECTION

It will be helpful to review some of the general features of memories and error correction circuits that apply to this invention. A memory stores binary data in units called words. In a read-write cycle, an addressed word is first read from the memory and is available to be transmitted to the system associated with the memory. The read operation also clears the addressed word location of its previous data to prepare for the forthcoming write portion of the cycle. The word read from the memory is then rewritten into the same location or a new word is written into this location. When the function of a read-write cycle is only to provide data from the memory to the associated system, the operation is called a fetch. An operation to write a new word is called a store.

In the associated system, the memory word is divided into portions that are called bytes. For example, a memory may have a word length of 72 bits that provides 8 bytes of 9 bits each. Bytes are commonly identified by a register called a Mark Register that has one position for each byte. In the system associated with the memory, each byte of data commonly includes one parity bit from which parity check circuits can detect errors in any single bit location. Such an error is called a single error, and simple parity check circuits cannot detect double errors or higher order errors. In the example of the 9-bit byte, a byte includes eight data bits and one parity bit; thus a word includes 64 data bits and 8 parity bits. Within the memory it is advantageous to use the eight parity positions to store a pattern of bits for correcting single errors (which can be detected but not corrected with a simple parity check) and for detecting double errors. One object of this invention is to provide a new and improved error correction circuit for a memory.

In a fetch operation on a memory using error correction, the word of data is read from the memory in its error correction form, it is checked for errors and any single errors are corrected, and it is transmitted to the associated system. Typically the data is converted from the error correction form of the memory to parity check form for the associated system. The subsequent write operation restores the original or corrected word to the same location in the memory. In a store operation, the associated system supplies a word to be written in the memory along with a parity bit for each byte of the word. The data bits are encoded to form error correction bits and the data bits and error correction bits are stored in the addressed location of the memory. Memories also perform a partial store operation in which certain byte locations of the addressed word receive new data and the other byte locations retain their original data. In a partial store operation the circuits that have already been described for the fetch operation receive a full word from the memory and check the word for errors. The circuits described for the store operation receive bytes from the system and the bytes from the memory that are to be retained, and the store circuits form a new set of error correction bits for the forthcoming write portion of the memory cycle. Errors that are found in the bytes that are to be retained are corrected.

In such a memory, the conventional read-write cycle may be undesirably lengthened by the time required between the read portion and the write portion to make the corrections. The error correction bits are Exclusive OR functions of the data bits, and this logic function usually involves cascade connections of logic circuits and corresponding time delays in the operation. When an error is detected and corrected, new error correction bits must be formed for the corrected word. A general object of this invention is to provide a new and improved circuit for forming the new check bits without going through the delay associated with the error correction code circuits. The following description of a prior art error correction circuit will be a helpful introduction to the specific circuit of this invention.

THE PRIOR ART

In a simplified circuit the word is read from the memory, a code is formed from the data portion of the memory and the new code is compared with the code that was read from the memory. The results of this comparison, called a syndrome, identifies in a coded form the location of the bit where the error exists. This bit is complemented to correct the error. Such an error can occur in either the data portion of the word or the error correction code portion.

As the circuit has been described so far, the corrected word contains the correct data and the correct code. The problem of updating the correction bits, introduced earlier, does not occur in this example. The update problem comes about because the circuits perform a partial store in addition to the fetch operation that this simplified explanation relates to. In either a store operation or a partial store operation, a new error correction code must be generated because a new word is being stored. In a partial store operation, this new word is corrected wherever an error is found in a byte of the memory word that is to be restored. The code read from the memory is not valid for the new word because it was encoded from the memory word. A code formed from the uncorrected word to be stored is also invalid. As has already been explained, reencoding the corrected word may undesirably lengthen the memory cycle.

The disclosure of E. Kolankowsky and A. K. Pattin at pages 1439 and 1440 of IBM Technical Disclosures Bulletin for Mar. 1968 discloses a faster circuit in which the location of the check bits are decoded from the location of the error. Each bit enters into the Exclusive OR logic function for predetermined ones of the check bit. Changing a particular data bit thus leads to changing particular code bits. This operation can be performed with fewer levels of logic than the operation of reencoding the entire word and the addition of such a circuit provides a faster operating cycle.

An object of this invention is to provide error correction circuitry for a memory with improved circuitry for locating the error correction bits that are to be updated.

THE INVENTION

According to this invention, circuit and means is provided to respond directly to the syndrome bits to update the error correction bits. It will be helpful to consider first a fetch operation and then a store operation. When an error is detected in the data portion of the word during a fetch operation (and there is not a double error) the code portion of the word read from memory is correct for the corrected word. Since the syndrome bits signify a difference between the code bits in the word read from memory (which are correct for the corrected data word) and the code bits generated from the incorrect word read from the memory, the syndrome bits signify errors in the code that is generated from the incorrect data. Individual registers and codes are provided for receiving and encoding a word received from the memory and the same word or a different word that is to be stored in the same location of the memory. Means associated with the encoder for the word from the memory is provided to form syndrome bits for locating an error and for complementing the error bit position before the memory word is transmitted to the associated system or restored in the memory. An error correction code update circuit is provided that in part includes logic circuits for complementing code bit positions for which corresponding syndrome bits have a logical one value and signify an error in the data rather than in the code bit portion of a memory word.

A partial store operation can easily be understood by assuming that both the memory word and the word to be stored contain entirely independent data and have independent codes but that both contain an error in a particular position. Since the memory word and the word to be stored have an error in the same bit position, the locations of code bits to be updated are the same for both words. (The relationship between a data bit location and the code bits that it affects depends on the code and not on the data that is encoded.) Thus the syndrome bits define the code bits to be changed on a partial store in the same way that has been described for a fetch operation. Means is provided to prevent a change in either the data or the code bits when an error is detected in a byte that is not to be restored.

The preferred memory conventionally includes an additional check bit that is a parity check on all the data and code bits. This bit distinguishes between odd numbers of errors and even numbers and thereby identifies an uncorrectable double error. Means is provided for updating this bit according to the parity of the other bits.

The foregoing and other objects, features and advantages of the invention will be apparent from the following more particular description of the preferred embodiment of the invention, as illustrated in the accompanying drawing.

THE DRAWING

The single figure in the drawing shows the preferred embodiment of the invention.

THE CIRCUIT OF THE DRAWING

Introduction

The drawing shows a memory 12, a data-in bus 13 that carries data to be stored in the memory, and a data-out bus 14 that carries data from the memory to an associated system. The memory 12 has a data register 16, and it supplies data to other components on a line 17 and receives data to be stored on a line 19. The error correction circuit of the drawing is preferably shared by a large number of memories that each have independent data registers 16. Suitable means for coupling several memories to common lines 16 and 17 are well known and are not shown in the drawing.

In the drawing the letters *d*, *c*, and *p* identify lines in the drawing as transmitting respectively data, error correction bits, and parity bits. At the input and output busses 13, 14 the word is in parity form, and in the memory the word is in error correction form. The circuits that transmit the word between the busses and the memory will be described as they appear in the following descriptions of the store, fetch, and partial store operations.

In a store operation, data is transmitted from the bus 13 to one of several storage positions in a buffer register 21. The buffer makes up for timing differences between the operation of the memory and the operation of the associated system. Circuits not shown in the drawing perform a conventional parity check on data in the buffer 21. The data portion of a word in buffer 21 is transferred to a STORE register 22 and from the store register the data is supplied in true and complement forms to a gate 23. Gate 23 is controlled, as will be explained later, to transfer either the true or the complement form of the data to the data portion of a STORE UPDATE register 25. Transmitting the complement changes the corresponding bit position in the store update register. Data from the store register 22 is also supplied to a circuit 27 (ECC GEN) that encodes the data bits to form error correction code bits. The error correction code bits are supplied in both true and complement form to a gate 30 that is controlled to transmit the true or complement of each bit as appropriate to provide updated error correction code bits to the code portion of store update register 25. The output of the store update register is connected to the input line 19 already introduced for storing the data in the memory 12. During the portion of the store operation just described, the memory 12 performs a read operation which functions to clear the addressed word location for the writing the word located in the store update register 25.

In a fetch operation, the memory operates through the read portion of its cycle and a memory word in error correction form is transferred from the memory to a FETCH register 32 and to the store register 22 already introduced. The data supplied to the store register is encoded in circuit 27 in the way that has been described already for regenerating the data in the memory at the end of the read operation. The data in the fetch register 32 is supplied to a circuit 35 (ECC GEN) that generates error correction bits. If the error correction bits generated by circuit 35 match the error correction bits read from the memory, there is no detectable error in the word. Error correction bits from the fetch register 32 and from the error correction code generator 35 are applied to a circuit 36 (COMPARE) that compares the corresponding bits in an Exclusive OR operation and produces output signals that are called syndromes and are identified by a letter *s* on lines of the drawing. (Equivalently, the data and code portions of the word in the fetch register are operated on by Exclusive OR circuits 35, 36 to produce syndromes directly). The syndrome bits are applied to a data locator circuit 38 and a parity bit locator circuit 39 that decoded the syndrome bits to provide an indication of the location of a bit in error.

Data from fetch register 32 is also applied in true and complement form, through a gate 41 that is controlled in response to the output of locator circuit 38 to transfer the correct data to the data portion of a FETCH UPDATE register 42. Circuit 35 also generates parity bits which are supplied in true and complement form through a gate 43 that is controlled in response to the output of locator circuit 39 to transmit the correct parity bits to the parity portion of the fetch update register. From fetch update register 42 corrected data and parity bits are available at the data out bus 14 to be transmitted to the associated system.

In a partial store operation, an addressed word of the memory is to have new data entered at certain byte locations and is to retain the original bytes at other locations. The particular bytes to be retained or stored are identified by the contents of a MARK register 45. The mark register controls the store register 22 to accept data from the buffer register 21 in certain byte locations and to accept data from the memory bus 17 in other byte locations. The data in the store register is then encoded in the way already described for the store operation and is entered into the store update register. A full word of data containing the bytes to be restored and the bytes to be erased is entered in the fetch register 32 and is operated on to correct errors in the way already described for fetch operations. However, errors located in the portion of the memory word that is being erased are not corrected since different data is being stored in these locations.

Although the error bit locator and the parity bit locator are well known, a somewhat detailed review of these circuits will be a helpful introduction to the check bit update circuit. In the preferred error correction code, 7 of the check bits form parity checks on certain data and check bit positions such that an error in any one of the data or check bits produces a unique pattern in the syndrome bits. The code may be arranged so that the syndromes form the binary number of the bit position where the error has occurred. The data locator circuit thus operates on this binary number to energize one of 64 lines into the gate circuits 23, and 41 to correct the error in the data portion of a word. If there is no error, the syndromes are all zero and no input to the gates 23, 41 is energized and the data in the store and fetch registers is entered into the store and fetch update registers in its true form. Similarly, the bit error locator does not respond to the syndrome patterns that signify an error in the check bit portion of the fetch register since an independent set of check bits is generated by the circuit 27. The circuit for locating the parity bit to be corrected is generally similar to the bit locator since each bit is associated with a particular parity bit position in the fetch update register. The eighth check bit is a parity check for the entire 72 bit word. If the check of this bit indicates that a double error has occurred, the errors can not be corrected and in this situation it is ordinarily preferable to inhibit the error correction operation that has just been described. An output is provided to signal that an uncorrectable error has occurred.

The check bit update circuit

When a single error occurs in the data portion of the fetch register, the code in the fetch register is correct but the code provided for the fetch update register is incorrect since it is based on the identical incorrect data in both the store and fetch registers. Since the syndromes signify the difference between the correct code in the fetch register and the incorrect code produced by the code generators, the syndromes directly indicate, for this example, the bit positions of the code that are to be changed to update the code for the corrected data bit.

To perform this operation, the update circuit includes logic circuitry that responds to the conditions that the syndromes are not all zeros, that no uncorrectable error is detected, and that the error is in the data portion and not in the code portion. Various equivalent statements of this logic function will be apparent.

In a partial store operation the data in the store register and the corresponding code are essentially independent of the data and code of the fetch register and the code produced by the generator except that if an error is detected in a particular data bit position of the fetch register that is to be restored, the same error exists in the same position of the store register. The check bit update circuit includes logic circuits responsive to the mark register to inhibit the update operation if the error occurs in a byte that is not to be restored in the memory. In other respects, the circuit components already described function to update the check bits on a partial store operation.

The code update circuit 40 also includes means for forming the parity of the code bits to update the double error detection bit.

While the invention has been particularly shown and described with reference to a preferred embodiment thereof, it will be understood by those skilled in the art that various changes in form and details may be made therein without departing from the spirit and scope of the invention.

We claim:

1. In a memory of the type having a fetch register arranged to receive a word from the memory, a store register adapted to receive a memory word to be restored in the memory or a new word to be stored or a word made up of bytes of a memory word to be restored and new bytes to be stored; means responsive to the contents of said store register for generating an error correction code to be stored with the word in the store register, and means responsive to the contents of said fetch register for producing syndromes and means responsive to said syndromes for correcting an error in a word read from the memory and any corresponding error in the word or byte of a word to be restored in the memory, wherein the improvement comprises;

2. The memory of claim 1 including a store update register means responsive to said error locator circuit for transferring data to be stored into said store update register and correcting any errors in said data;

means controlling said code update means to update the code in said store update register; and means controlling said store update register to provide a word to be stored in the memory.

3. The memory of claim 2 wherein said store register and said code generating means provide true and complement forms and;

said means controlling said code update means comprise gates for selectively transferring from said store register to said store update register the true or complement values for correcting data errors and updating the code.

4. A memory according to claim 1 in which said code update means includes logic means differently responsive to syndrome patterns signifying data errors and to syndrome patterns signifying code errors for updating the error correction code only in response to a data error.

5. A memory according to claim 1 including a mark register identifying bytes of a memory word to be restored and bytes not to be restored wherein said code update means includes:

means responsive to the output of said mark register to update the code only when a detected error occurs in a byte that is to be restored in the memory.

6. A memory according to claim 1 in which the code includes bits locating a single error and one bit detecting but not locating a double error wherein said code update means includes:

means responsive to said double error detection bit to update the code only on occurrence of a single error.

7. A memory according to claim 6 in which said code update means includes:

means for updating said double error detection bit according to an Extensive OR function of said other code bits.

8. A memory according to claim 1 including a mark register identifying bytes to be restored and bytes to be not restored wherein said code update means includes:

means responsive to said mark register and to selected syndrome patterns signifying single data errors in bytes to be restored for updating said code only when an error has been corrected in a byte to be restored.

PO-1050
(5/69)

UNITED STATES PATENT OFFICE
CERTIFICATE OF CORRECTION

Patent No. 3,568,153 Dated March 2, 1971

Inventor(s) Gerald W. Kurtz et al

It is certified that error appears in the above-identified patent and that said Letters Patent are hereby corrected as shown below:

Column 6, line 6, the following should be inserted:
-- code update means connected to said syndrome producin means to receive said syndromes and to change the code bit locations corresponding to said syndromes to update the code when a data error is corrected. --

Signed and sealed this 30th day of May 1972.

(SEAL)
Attest:

EDWARD M.FLETCHER,JR.
Attesting Officer

ROBERT GOTTSCHALK
Commissioner of Patents